(12) United States Patent
Stratton et al.

(10) Patent No.: US 11,194,157 B1
(45) Date of Patent: Dec. 7, 2021

(54) HEAD UP DISPLAY (HUD) WITH INCREASED FIELD OF VIEW

(71) Applicant: Rockwell Collins, Inc., Cedar Rapids, IA (US)

(72) Inventors: Eric P. Stratton, Portland, OR (US); Ming Yu, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/933,320

(22) Filed: Mar. 22, 2018

(51) Int. Cl.
| *G02B 27/01* | (2006.01) |
| *G02B 27/30* | (2006.01) |
| *F21V 8/00* | (2006.01) |
| *G02B 27/10* | (2006.01) |

(52) U.S. Cl.
CPC ....... *G02B 27/0172* (2013.01); *G02B 6/0016* (2013.01); *G02B 6/0036* (2013.01); *G02B 27/1086* (2013.01); *G02B 27/30* (2013.01); *G02B 2027/0123* (2013.01)

(58) Field of Classification Search
CPC ............ G02B 27/0172; G02B 27/1086; G02B 6/0016; G02B 27/30; G02B 6/0036; G02B 2027/0123
See application file for complete search history.

(56) References Cited

U.S. PATENT DOCUMENTS

| 4,309,070 | A | 1/1982 | St. Leger Searle |
| 4,711,512 | A | 12/1987 | Upatnieks |
| 8,634,139 | B1 | 1/2014 | Brown et al. |
| 8,749,890 | B1 | 6/2014 | Wood et al. |
| 8,903,207 | B1 | 12/2014 | Brown et al. |
| 8,937,772 | B1 | 1/2015 | Burns et al. |
| 9,366,864 | B1 | 6/2016 | Brown et al. |
| 9,519,089 | B1 | 12/2016 | Brown et al. |
| 9,523,852 | B1 * | 12/2016 | Brown ............... G02B 27/0101 |
| 9,715,067 | B1 | 7/2017 | Brown et al. |
| 2010/0277803 | A1 * | 11/2010 | Pockett .............. G02B 27/0172 359/567 |
| 2017/0299864 | A1 * | 10/2017 | Vallius ............... G02B 27/0172 |
| 2017/0306862 | A1 | 10/2017 | Waite, III et al. |

OTHER PUBLICATIONS

U.S. Appl. No. 13/250,940, filed Sep. 30, 2011, Stahl et al.
U.S. Appl. No. 14/715,332, filed May 18, 2015, Brown et al.
U.S. Appl. No. 15/429,569, filed Feb. 10, 2017, Brown et al.
U.S. Appl. No. 15/136,841, filed Apr. 22, 2016, Yu et al.
U.S. Appl. No. 62/451,041, filed Jan. 26, 2017, Brown et al.

* cited by examiner

*Primary Examiner* — Amit Chatly
(74) *Attorney, Agent, or Firm* — Suiter Swantz pc llo

(57) ABSTRACT

A head up display can be used in compact environments. The head up display includes a combiner system including at least one light pipe and a waveguide. The at least one light pipe includes a diffraction grating or mirror array for providing light into the waveguide from the light pipe. The light pipe is configured to receive light and provide first light in a first direction for a first field of view and second light in a second direction for a second field of view. The combiner system can be head worn or stand-alone and can provide dual axis pupil expansion.

19 Claims, 3 Drawing Sheets

HEAD UP DISPLAY (HUD) WITH INCREASED FIELD OF VIEW

CROSS REFERENCE TO RELATED APPLICATIONS

The present application is related to U.S. application Ser. No. 15/429,569 incorporated herein by reference in its entirety and assigned to the assignee of the present application which claims priority to U.S. Provisional Patent Application Ser. No. 62/451,041, fild on Jan. 26, 2017, entitled "A Head Up Display (Hud) Using A Light Pipe With Angled Orientation With Respect To The Combiner And Micro Collimator System And Method For A Head Up Display (HUD)", incorporated herein by reference in its entirety and is related to U.S. application Ser. No. 15/136,841, incorporated herein by reference herein in its entirety and assigned to the assignee of the present application, which is a continuation-in-part of U.S. patent application Ser. No. 14/715,332 filed on May 18, 2015, entitled "A Turning Light Pipe for A Pupil Expansion System and Method," incorporated herein by reference herein in its entirety and assigned to the assignee of the present application and which is a continuation-in-part of a U.S. Pat. No. 9,523,852 filed on Jul. 30, 2015, entitled "Micro Collimator System and Method for a Head Up Display (HUD)" incorporated herein by reference herein in its entirety and assigned to the assignee of the present application, which is related to U.S. patent application Ser. No. 13/432,662 filed on Mar. 28, 2012 entitled "System For And Method of Catadioptric Collimation In A Compact Head Up Display (HUD)," incorporated herein by reference in its entirety and assigned to the assignee of the present application, which is a continuation-in-part application of: U.S. Pat. No. 8,634,139 filed on Sep. 30, 2011 entitled "System For And Method of Catadioptric Collimation In A Compact Head Up Display (HUD)," incorporated herein by reference in its entirety and assigned to the assignee of the present application; "U.S. patent application Ser. No. 13/250,940, entitled, "Head Up Display (HUD) Utilizing Diffractive Gratings Having Optimized Efficiency," filed on Sep. 30, 2011, incorporated herein by reference in its entirety, and assigned to the assignee of the present application, now abandoned; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. Pat. No. 8,903,207, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. Pat. No. 8,937,772, entitled, "System For and Method of Stowing HUD Combiners," filed on Sep. 30, 2011 and assigned to the assignee of the present application, incorporated herein by reference in its entirety; and U.S. Pat. No. 8,749,890, entitled, "Compact Head Up Display (HUD) for Cockpits with Constrained Space Envelopes," filed on Sep. 30, 2011, incorporated herein by reference herein in its entirety and assigned to the assignee of the present application.

BACKGROUND

Embodiments of the inventive concepts disclosed herein relate to substrate guided displays including but not limited to head up displays (HUDs), such as, fixed HUDs and worn displays (e.g., head worn displays, helmet mounted displays, virtual glasses, etc.).

HUDs provide significant safety and operational benefits including precise energy management and conformal flight paths. These safety and operational benefits are enjoyed by operators of air transport aircraft, military aircraft, regional aircraft and high-end business jets where HUDs are generally employed. These safety and operational benefits are also desirable in smaller aircraft.

Conventional HUDs are generally large, expensive and difficult to fit into smaller aircraft, such as, business and regional jets as well as general aviation airplanes. Often, conventional HUDs rely on large optical components to form an adequate field of view and viewing eye box. The large optical components are often associated with collimating or non-collimating projectors and include lens, prisms, mirrors, etc. The volume of the packages including the optical components of the HUD is often too large to fit within the constrained space in the cockpit of smaller aircraft. Further, conventional HUDs rely upon optical components which are generally too expensive for the cost requirements of smaller aircraft and worn displays.

Substrate guided HUDs have been proposed which use waveguide technology with diffraction gratings to preserve eye box size while reducing size of the HUD. U.S. Pat. No. 4,309,070 issued St. Leger Searle and U.S. Pat. No. 4,711,512 issued to Upatnieks disclose substrate waveguide HUDs. U.S. Pat. No. 8,634,139 discloses a catadioptric collimator for HUDs. The U.S. patent applications listed in the Cross Reference to Related Applications above disclose compact head up displays and near eye displays using multiple gratings, multiple waveguides, and/or multiple waveguide layers for dual axis pupil expansion. Dual axis expansion using waveguides requires additional complexity and can adversely affect brightness and contrast, as well as increase size and cost of the HUDs.

The use of dual waveguides, with a first expanding waveguide to produce an elongated pupil from a small round collimating lens, and a second expanding waveguide to elongate the previously expanded pupil in an orthogonal direction to produce a final expanded pupil that greatly exceeds the size of the collimating lens both horizontally and vertically can be a very lossy solution. The solution requires twice the number of gratings as required for single axis expansion and an air gap. Providing light across the air gap can induce geometric coupling losses. In another example, dual axis expansion is achieved using a turning grating in the same waveguide as the input and output couplers, where the turning grating provides both a first expansion axis and a change in direction, such as 90 degrees in one embodiment, of the light beam so that the output coupler can act as the second expansion axis. This solution can also be lossy, have lower contrast, exhibit poor uniformity, and require a larger space.

SUMMARY

In one aspect, embodiments of the inventive concepts disclosed herein relate to a head up display. The head up display includes a first light pipe and a waveguide combiner. The first light pipe is configured to expand a pupil in a first direction and includes at least one diffraction grating or mirror array. The waveguide combiner is configured to expand the pupil in a second direction perpendicular to the first direction.

In another aspect, embodiments of the inventive concepts disclosed herein relate to a head up display. The head up display includes a first light pipe and a waveguide combiner. The light pipe is configured to provide pupil expansion along a first axis and receive light and provide first light in a first direction for a first field of view and second light in a second direction for a second field of view. The first direction is opposite to the second direction. The waveguide combiner is in optical communication with the light pipe and is configured to receive the first light from the light pipe and the second light from the light pipe. The waveguide combiner is configured to expand the pupil along a second axis approximately perpendicular to the first axis and provide output light combining the first field of view and the second field of view.

In a further aspect, embodiments of the inventive concepts disclosed herein related to a method. The method provides information to a pilot. The method includes providing an image from a projector to a center portion of a light pipe, and causing first light associated with the image to travel in a first helical fashion in a first direction along the light pipe toward a first end of the light pipe and second light associated with the image to travel in a second helical fashion in a second direction of the light pipe toward a second end of the light pipe. The method also includes providing the first light and the second light from the light pipe to a waveguide combiner having a main surface, and providing the image from the main surface, wherein the image is expanded in two axes.

In still further aspect, embodiments of the inventive concepts disclosed herein relate to a head up display. The at least one light pipe has four elongated surfaces. A first pair of the elongated surfaces are parallel to each other and a second pair of the elongated surfaces are at an angle with respect the first pair of the elongated surfaces. The light pipe is configured to expand a pupil in a direction parallel to the four elongated surfaces. The light pipe includes a first light pipe input grating configured to direct first light associated with a first field of view in a first direction and a second light pipe input grating configured to direct second light associated with a second field of view in a second direction. The first light and the second light strike the four elongated sides and travel along the light pipe. The waveguide combiner has a main surface for viewing an image associated with the first light and the second light. The waveguide combiner is configured to expand the pupil in another direction on the main surface.

BRIEF DESCRIPTION OF THE DRAWINGS

Exemplary embodiments of the inventive concepts disclosed herein are hereafter described with reference to the accompanying drawings, wherein like numerals denote like elements; and.

DETAILED DESCRIPTION

Figure 1:
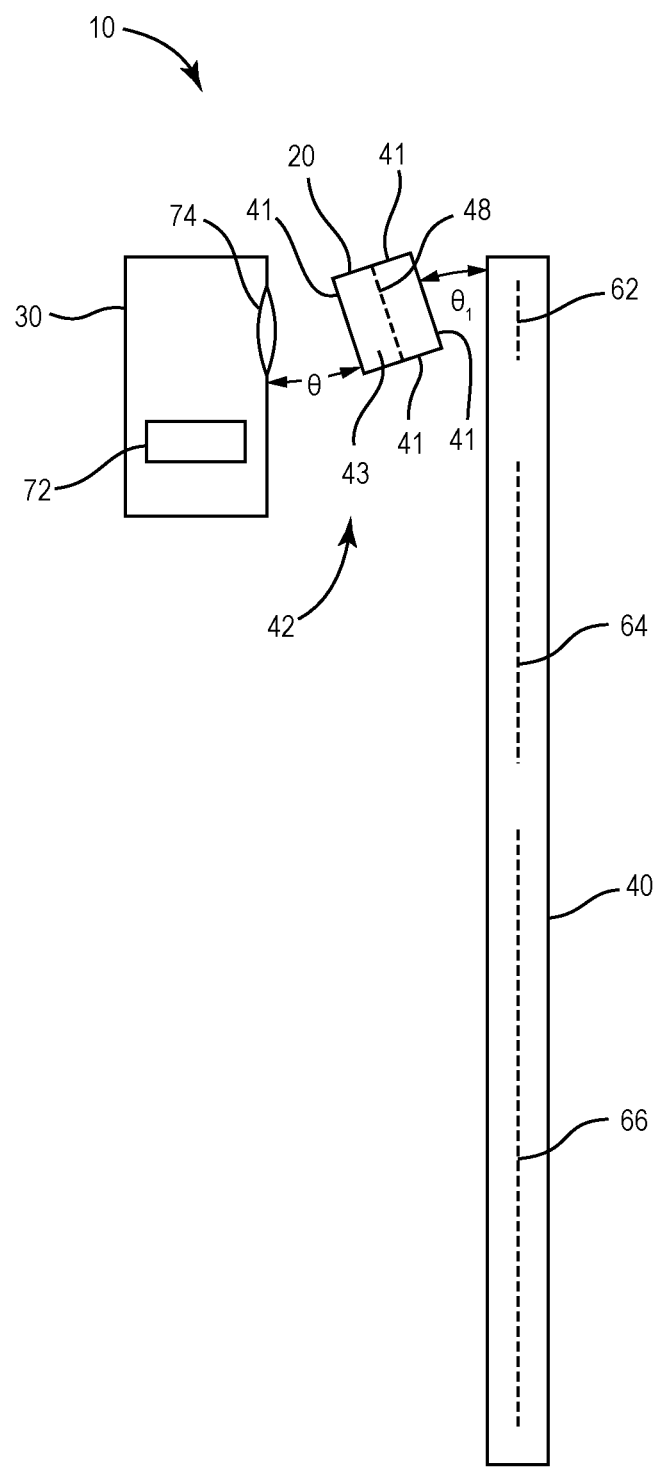
FIG. 1 is a side view schematic drawing of a head up display (HUD) display system in accordance with some exemplary embodiments of the inventive concepts disclosed herein.

Before describing in detail the particular improved system and method, it should be observed that the inventive concepts disclosed herein include, but are not limited to, a novel structural combination of optical components and not in the particular detailed configurations thereof. Accordingly, the structure, methods of manufacture and use, functions, control and arrangement of components have been illustrated in the drawings by readily understandable block representations and schematic drawings, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

In some embodiments, a light pipe is used to reduce a vertical size limit of the waveguide. Light travels down the light in a corkscrew helical, or spiral fashion while it is propagating along one axis of expansion and it is extracted in a controlled manner using either a leaky reflective coating or through the use of a turning grating as discussed in U.S. Pat. No. 9,523,852. In some embodiments, the light pipe is configured so that the light travels in two different directions from the middle of the light pipe to the ends of the light pipe. In some embodiments, the field of view is divided at the input coupler of the light pipe and half or other percentage of the field of view travels in one direction while the remaining field of view travels in an opposite direction. The fields of view are combined in a larger output combiner of a waveguide. In some embodiments, the split field of view technique using the light pipe provides a smaller, less expensive HUD with a superior field of view.

In some embodiments, the HUD does not suffer from less than desirable refractive index differences between the light pipe and the planar waveguide. In some embodiments, the light pipe is separated from the planar waveguide by an air gap and is not attached to planar waveguide with an adhesive as conventional wisdom dictates. The separation between the two optical components the HUD reduces constraints on planarity between the two optical components, thereby making the device easier to manufacture and test because the two optical components can be tested separately in some embodiments. Poor co-planarity in conventional systems can cause double images. In some embodiments, the light pipe uses a two grating design (an input grating and one or more output gratings) and does not use a turning grating or reflective array, thereby reducing drawbacks in the field of view due to very high skew ray angles in light pipe. In some embodiments, the HUD achieves a field of view (FOV) of 72 degrees by 40 degrees or greater which is greater than a conventional 25 degree circular or square FOV.

Figure 2:
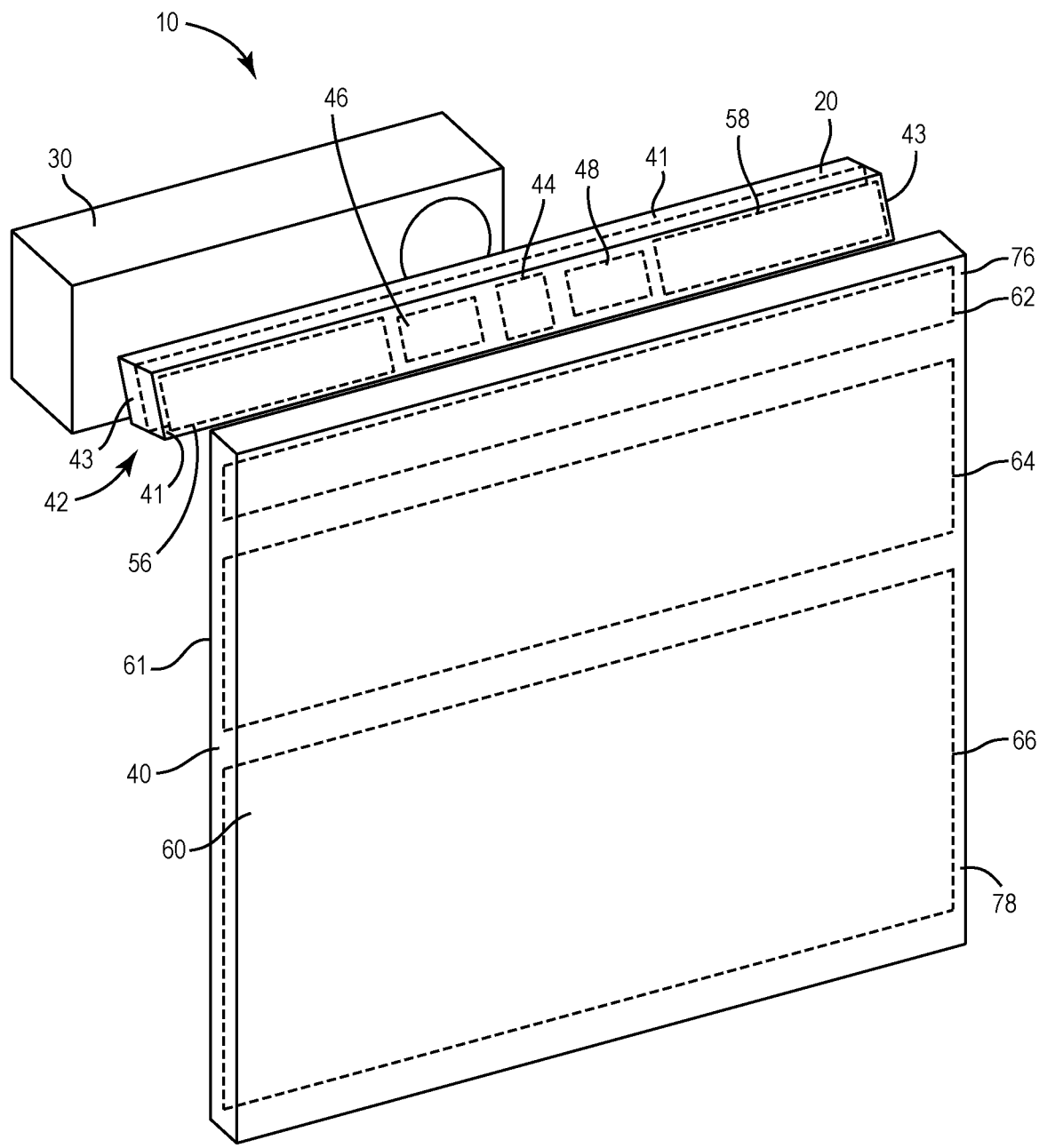
FIG. 2 is a perspective view schematic drawing of the HUD system illustrated in FIG. 1 in accordance with some exemplary embodiments of the inventive concepts disclosed herein.

With reference to FIGS. 1 and 2, a HUD system 10 can be utilized in various applications, including aviation, medical, naval, targeting, ground based, military, entertainment, etc. The term HUD as used herein refers to a fixed HUD, a near eye display, a worn display, a helmet mounted display or any type of display using a combiner for overlaying images from an image source over a real world scene. The HUD system 10 is configured for use in smaller cockpit environments and in worn display applications and yet provides an appropriate field of view and eye box for avionic applications in some embodiments. The HUD system 10 can be configured for use with worn components, such as, glasses, goggles, hats, helmets, etc. or be a HUD system with a fixed combiner in some embodiments. A worn version of the HUD system 10 can have a display area of 40 centimeter squared or less, and a fixed version of the HUD system 10 can have a display area of more than 50 centimeters squared.

The HUD system 10 includes a light pipe 20, a projector 30 and a waveguide combiner 40. The light pipe 20 and the waveguide combiner 40 provide a substrate waveguide system 42. The substrate waveguide system 42 achieves close to a 90 degree angle between two directions of pupil expansion and therefore, provides a compact and high efficiency system with large unvignetted eye box with dispersion compensation in some embodiments. In some embodiments, the light enters the light pipe 20 as collimated light and leaves the light pipe 20 and the waveguide combiner 40 as collimated light.

The light pipe 20 is a glass elongated rectangular prism with four elongated sides 41 and two square or rectangular ends 43. The light pipe 20 is a single piece or can include multiple pieces. The material (e.g., optical glass or plastic) for the light pipe 20 has a high index of refraction (e.g., greater than 1.5 in some embodiments) (e.g., 1.52). Other suitable optical materials can be used for the light pipe 20. The light pipe 20 includes an input coupler 44, a pair of beam splitters 46 and 48, and a pair of output coupler 56 and 58.

The input coupler 44 is a single collection of diffraction gratings (e.g., surface relief gratings, replicated gratings, volumetric gratings, Bragg gratings, etc.) or a pair of diffraction gratings in some embodiments. The diffractions gratings for the input coupler 44 are configured to split the light form the projector 30 and provide the light in two separate paths from the middle of the light pipe 20 toward the ends 43. In some embodiments, the output couplers 56 and 58 are diffraction gratings (e.g., surface relief gratings, replicated gratings, volumetric gratings, Bragg gratings, etc.) or mirrored elements or surfaces. In some embodiments, the diffraction gratings for the couplers 44, 56, and 58 are turn gratings.

The beam splitters 46 and 48 are disposed in the light pipe 20 perpendicular with a pair of the sides 41 and between the input coupler 44 and the respective output couplers 56 and 58. The beam splitters 46 and 48 are optional and is provided as a beam splitting surface for increasing the number of rays propagating through the light pipe 20 for improved uniformity.

The waveguide combiner 40 is a glass or plastic material having a high index of refraction (e.g., greater than 1.5 in some embodiments) (e.g., 1.52). The waveguide combiner 40 includes an input coupler 62, a beam splitter 64, and an output coupler 66. The beam splitter 64 is optional and is provided as a beam splitting surface for increasing the number of rays propagating through the waveguide combiner 40 for improved uniformity. In some embodiments, the input coupler 62 and the output coupler 66 are diffraction gratings (e.g., surface relief gratings, replicated gratings, volumetric gratings, Bragg gratings, etc.) or mirror elements.

Gratings for the input coupler 44, the input coupler 62, the output couplers 56 and 58 and the output coupler 66 can include but are not limited to volume holograms, replicated gratings, Bragg gratings, or surface relief gratings. In some embodiments, the gratings are encapsulated gratings such as those described in U.S. Pat. No. 9,519,089, incorporated herein by reference in its entirety. The gratings are reflection type or transmission type gratings in some embodiments. In some embodiments, the gratings are rolled-K-vector output gratings. Rolled K-vector output gratings include volumetric diffraction gratings with different K vectors and the same grating period in some embodiments.

The input coupler 62 and the output coupler 66 are matched, reciprocal gratings in some embodiments. The input coupler 62 and the output coupler 66 are gratings matched in spatial frequency in some embodiments. The input coupler 44 and the output couplers 56 and 58 are matched reciprocal gratings in some embodiments. The input coupler 44 and the output coupler 66 are matched reciprocal gratings in some embodiments.

By making the gratings reciprocal, dispersion is corrected. The design only needs to consider the fields coming from the input couplers that are incident on the output couplers at the same angles they left the input couplers. The use of turning gratings, as used in other conventional systems, relies on the ability of the turning grating to efficiently diffract skew rays. In practice, gratings can fail to perform well when the skew angle exceeds 45 degrees, especially at the higher angles >70 degrees. This puts limitations on the total FOV that can be viewed with a waveguide system containing a turning grating.

In some embodiments, an air gap or low index of refraction material is disposed between the light pipe 20 and the waveguide combiner 40. The provision of the air gap provides a higher numerical aperture (NA) which results in a larger field of view. NA=square root $(n^2_{light\ pipe}-n^2_{air})$ where: $n_{light\ pipe}$ is the index of refraction of the glass material associated with the light pipe 20 (e.g., greater than 1.52, and equal to approximately 1.6 in some embodiments); and $n_{air}$ is the index of refraction associated with the air gap (e.g., 1.0). If the light pipe 20 is adhered to the waveguide combiner 40, the NA is decreased because the adhesive and material associated with the waveguide combiner 40 have a higher index of refraction than air. The refractive index of the adhesive is greater than 1.33 in some systems. The field of view is increased by approximately 50 percent using the HUD system 10 with an air gap in some embodiments.

In addition, the air gap between the light pipe 20 and the waveguide combiner 40 loosens the alignment tolerances considerably and allows for an angle to be disposed between an elongated surface (the sides 41) of the light pipe 20 and the sides 60 and 61 of the waveguide combiner 40. Light pipe 20 can advantageously be built and tested separately from the waveguide combiner 40 due to the separation. Further, rotating the light pipe 20 with respect to the waveguide combiner 40 enables a new degree of freedom in aligning the desired field of view within the numerical aperture of the light pipe 20 which improves field of view. In some embodiments, planar waveguide combiners can be angled strategically for better fit into aircraft or other environments.

In operation, the HUD system 10 provides images from the projector 30 via the substrate waveguide system 42 to a pilot or other operator so that the pilot or other operator simultaneously views the images and a real world scene in some embodiments. The images can include graphic and/or text information (e.g., flight path vector) related to avionic information in some embodiments. In addition, the images can include synthetic or enhanced vision images. In some embodiments, collimated light is provided to the substrate waveguide system 42 so that the pilot can view the image conformally on the real world scene through the substrate waveguide system 42.

The projector 30 provides light (an image) to the waveguide combiner 40 which operates as a combiner via the light pipe 20. The projector 30 includes an image source 72 and collimating optics 74. The projector 30 provides an image from the image source 72 and collimates the image via the collimating optics 74 for display on the waveguide combiner 40.

The image source 72 is any device for providing an image including but not limited to a CRT display, a light emitting diode (LED) display, an organic light emitting diode (OLED) display, an inorganic light emitting diode (ILED), a micro-LED array, an active matrix liquid crystal display (AMLCD), a liquid crystal on silicon (LCOS) display, a laser display, etc. In some embodiments, the image source 72 is a micro display and provides linearly polarized light (e.g., S or P polarized).

The collimating optics 74 are disposed between the waveguide combiner 40 and the image source 72. The collimating optics 74 can be a single optical component, such as a lens, or include multiple optical components. In one embodiment, the collimating optics 74 are configured as a catadioptric collimator. The collimating optics 74 are integrated with or spaced apart from image source 72 and/or substrate waveguide system 42 in some embodiments. The projector 30 can be a collimating optical system including but not limited to any one of the collimators described in the applications incorporated herein by reference, such as, U.S. patent application Ser. No. 15/136,684, U.S. patent application Ser. No. 14/715,332, U.S. patent application Ser. No. 14/814,020, U.S. patent application Ser. No. 13/432,662, and U.S. Pat. No. 8,634,139. The projector 30 can use light emitting diode (LED) or laser-based illumination, or can be a digital light projector-based (DLP-based) projector, or a liquid crystal on silicon-based (LCOS-based) projector in some embodiments. In some embodiments, the projector 30 is a monochrome projector or a color projector using a separate substrate waveguide system 42 (light pipe 20 and waveguide combiner 40) for each color.

In operation, the light pipe 20 receives the light from the projector 30 at a middle portion associated with the input coupler 44 and divides the light so that first light travels toward an end of the light pipe 20 associated with the output coupler 56 and second light travels toward an end of the light pipe 20 associated with the output coupler 58. The first light and the second light travel in a helical fashion striking all four elongated sides 41 as they travel in opposite directions down the light pipe 20. The first light and the second light are expanded (e.g., the pupil is expanded) in a direction along the longitude of the light pipe 20. The first light and the second light are ejected from respective output couplers 56 and 58 to the waveguide combiner 40.

In some embodiments, the input coupler 44 is a set of diffraction gratings having two segments slanted. One segment is slanted to the left and one is slated to the right (e.g., a plus one order and a minus one order that are mirrored angled to each other, thereby naturally splitting the light perpendicularly striking the input coupler 44 to the plus one and the minus one order). In some embodiments, two input couplers are used one configured to direct right to the left and the other configured to direct the light to the right. The couplers can be provided one behind the other. In some embodiments, the input coupler 44 is a pair of switchable Bragg gratings where one diffracts the light to the left when on and the other diffracts the light to the right when on. The switchable Bragg gratings are controlled to efficiently provide the light in both directions in some embodiments.

The first light and the second light from the light pipe 20 are viewed on main sides 60 and 61 of the waveguide combiner 40 as a combined image. The waveguide combiner 40 includes the input coupler 62 disposed on a top portion 76 of main sides 60 and 61 (or a surface parallel to the sides 60 or 61) of the waveguide combiner 40 in some embodiments. The beam splitter 64 is disposed in the waveguide combiner 40 parallel with the sides 60 and 61 and between the input coupler 62 and the output coupler 66. The output coupler 66 is disposed at a bottom portion 78 of the waveguide combiner 40 on the sides 60 and 61 (or their parallel) in some embodiments.

The first light from the output coupler 56 of the light pipe 20 and the second light from the output coupler 58 is diffracted into the waveguide combiner 40 by the input coupler 62. The light diffracted into the waveguide combiner 40 propagates down the waveguide combiner 40 by total internal reflection until it reaches the output coupler 66 where it is ejected from the waveguide combiner 40 toward the user.

As shown in the embodiment of FIG. 1, an angle $\theta_1$ between one (e.g., the closest) of the elongated sides 41 of the light pipe 20 and the sides 60 and 61 (FIG. 2) is between 0 and plus or minus 45 degrees (e.g., between 5 and 25 degrees). In some embodiments, the angle between the output lens of the projector 30 and the light pipe 20 is similarly angled. In some embodiments, the angle $\theta$ between the output lens of the projector 30 and the light pipe 20 is a different angle than angle $\theta_1$. In some embodiments, the angle between the output lens of the projector 30 and a line normal to one of the elongated sides 41 of the light pipe 20 is perpendicular. By rotating the light pipe 20 with respect to the waveguide combiner 40 and by aligning the output couplers 56 and 58 correctly, fields of view are all sent down the substrate waveguide system 42 in one mode which eliminates multiple images in the output field. The rotation allows the field of view to be set within the desired numerical aperture of the light pipe 20 in some embodiments.

A frame or bracket can be used to secure the light pipe 20 and the waveguide combiner 40 at the appropriate angle. In some embodiments, the bracket holds the light pipe 20 at its ends and the waveguide combiner 40 at its top or on its sides. The bracket is plastic or metal in some embodiments.

With reference to FIG. 1, the projector 30 and the user are disposed on the same side 61 or 60 of waveguide combiner 40 in some embodiments. The projector 30 and user can also be disposed on opposing sides 60 and 61 of the waveguide combiner 40 in some embodiments. In some embodiments, the projector 30 is disposed above the light pipe 20. In some embodiments, the light pipe 20 is disposed in front of or behind the waveguide combiner 40.

Figure 3:
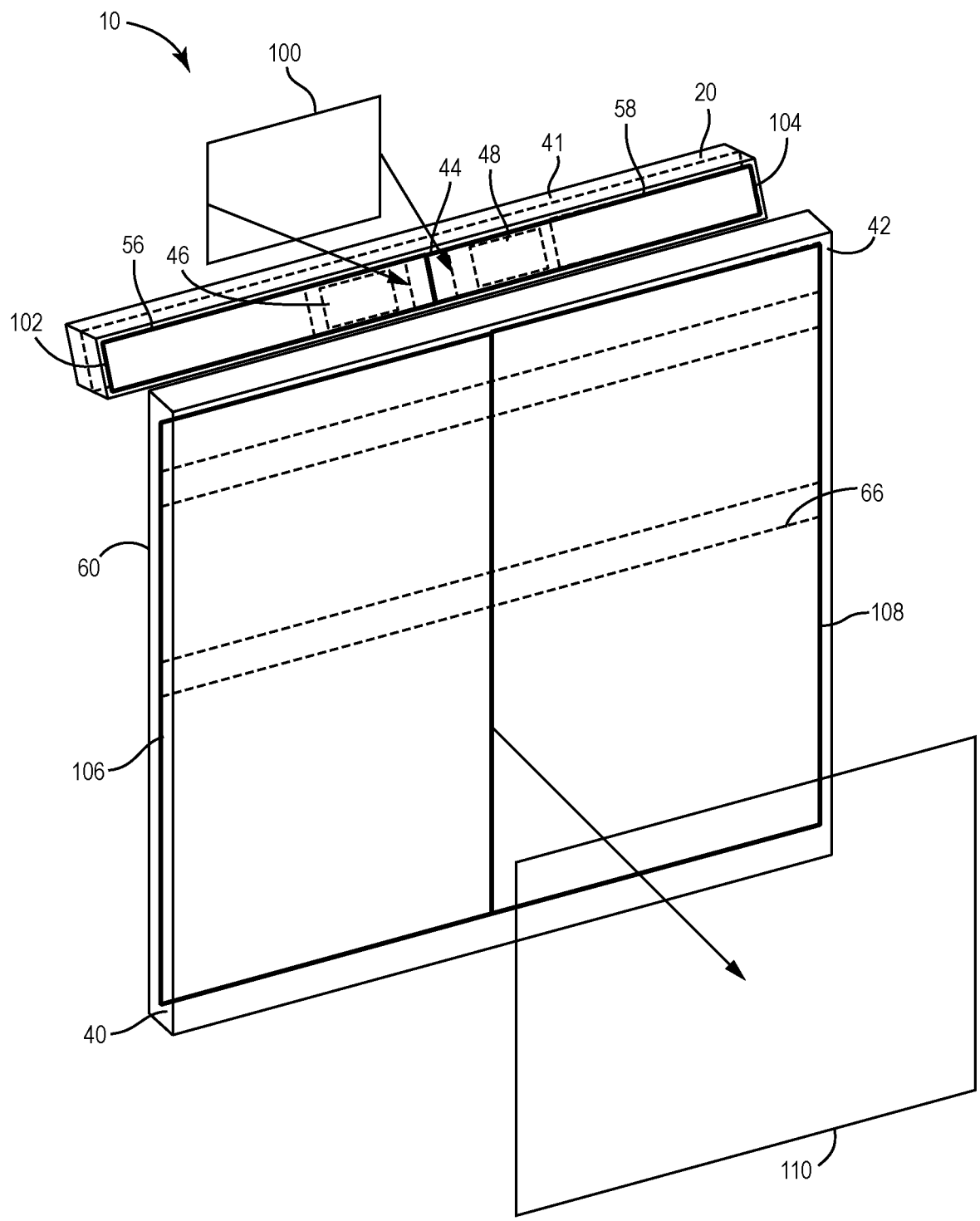
FIG. 3 is a perspective view schematic drawing of the HUD system illustrated in FIG. 1 showing the field of view in accordance with some exemplary embodiments of the inventive concepts disclosed herein.

With reference to FIG. 3, a field of view 100 provided by the projector 30 is split by the input coupler 44 of the light pipe 20 into a field of view 102 and 104. The field of view 102 and the field of view 104 are expanded in one direction and provided as field of views 106 and 108 expanded in two directions from the waveguide combiner 40. In some embodiments, the field of view 102 is from 0 to negative 36 degrees and the field of view 104 is from 0 to 36 degrees (e.g., non-overlapping). The waveguide combiner 40 can provide a 72 degree field of view in the first axis in such an embodiment. In some embodiments, the field of view 104 is from positive five degrees to negative 31 degrees and the field of view 104 is from negative 5 to positive 31 degrees (e.g., overlapping). The waveguide combiner 40 can provide a 62 degree field of view in the first axis in such an embodiment The fields of view discussed above are exemplary; other fields of view dimensions and shapes can be achieved. Larger fields of view can be obtained depending on glass index, grating index, and orientation of the light pipe 20 and the waveguide combiner 40. The amount of overlap can vary between zero and 15 degrees in some embodiments.

The HUD system 10 can be rotated at any angle to provide different orientations (upside down, rotate 90 degrees, 270 degrees). In some embodiments, the projector 30 is one of the projectors 30, 500, 700 and 750 described in Exhibit B of U.S. Provisional Patent Application Ser. No. 62/451,041, filed on Jan. 26, 2017, entitled "A HEAD UP DISPLAY (HUD) USING A LIGHT PIPE WITH ANGLED ORIENTATION WITH RESPECT TO THE COMBINER AND MICRO COLLIMATOR SYSTEM AND METHOD FOR A HEAD UP DISPLAY (HUD)", incorporated herein by reference in its entirety. In some embodiments, the projector 30 is configured to provide an exit pupil between 3 mm and 5 mm in diameter and has a cubic beam splitter with a physical size of 4.5 mm to 15 mm per side for HWDs. In some embodiments, the projector 30 is configured to provide an exit pupil between 2 mm and 25 mm in diameter.

In some embodiments, the HUD system 10 includes a substrate waveguide system 42 for each eye of the user. A single projector 30 can supply light for each substrate waveguide system 42 or a separate projector 30 can be provided for each substrate waveguide system 42. In some embodiments, a single substrate waveguide system 42 is provided in front of both eyes.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, shapes, dimensions and angles are mentioned, other components, dimensions and angles can be utilized. Various changes may be made to the details disclosed without departing from the spirit of the invention which is defined by the following claim.

What is claimed is:

1. A head up display with an increased field of view, comprising:
    a light pipe configured to provide pupil expansion along a first axis and receive light and provide first light in a first direction for a first field of view and second light in a second direction for a second field of view, the first direction being opposite to the second direction; and
    a waveguide combiner in optical communication with the light pipe and configured to receive the first light from the light pipe and the second light from the light pipe, the waveguide combiner being configured to provide pupil expansion along a second axis approximately perpendicular to the first axis and provide output light combining the first field of view and the second field of view to provide a single image using the first light and the second light, wherein the waveguide combiner includes an output coupler configured to combine the first light and the second light;
    wherein the waveguide combiner is disposed at an angle with respect to the light pipe, the angle being greater than 0 degrees and less than 45 degrees, and wherein the waveguide combiner is detached from the light pipe and separated from the light pipe by an air gap.

2. The head up display of claim 1, wherein the angle is more than 5 degrees and less than 25 degrees.

3. The head up display of claim 1, wherein the light pipe comprising a first light pipe input grating for the first light and a second light pipe input grating for the second light and a first light pipe output grating for the first light and a second light pipe output grating for the second light.

4. The head up display of claim 1, wherein the light pipe comprises a first light pipe input grating for the first light and a second light pipe input grating for the second light and a first light pipe output grating for the first light and a second light pipe output grating for the second light, and wherein the waveguide combiner comprises a combiner input grating configured to receive the first light and the second light from the first light pipe output grating and the second light pipe output grating, wherein the output coupler is a single combiner output grating.

5. The head up display of claim 4, wherein the first light pipe input grating is reciprocal to the first light pipe output grating.

6. The head up display of claim 4, wherein the light pipe comprises four elongated surfaces comprising at least four elongated surfaces that are parallel to each other, wherein the first light pipe input grating and the second light pipe input grating and the first light pipe output grating and the second light pipe output grating are provided in one or more planes parallel to the two of the four or more parallel elongated surfaces or on at least one of the elongated surfaces.

7. The head up display of claim 6, wherein the first light travels in the first direction in a helical fashion striking the four or more elongated sides and the second light travels in the second direction in a helical fashion striking the four or more elongated sides.

8. The head up display of claim 1, further comprising:
    a first light pipe input grating for the first light;
    a second light pipe input grating for the second light;
    a first light pipe output grating for the first light;
    a second light pipe output grating for the second light; and
    a collimator disposed in front of the first light pipe input grating and the second light pipe input grating associated with the second light.

9. The head up display of claim 8, further comprising:
    a first beam splitter disposed between the first light pipe input grating and the first light pipe output grating; and
    a second beam splitter disposed between the second light pipe input grating and the second light pipe output grating.

10. The head up display of claim 1, wherein the light pipe and the waveguide combiner are part of a head worn display.

11. A method of providing information to a user, the method comprising:
    providing an image from a projector to a center portion of a light pipe;
    causing first light associated with the image to travel in a first helical fashion in a first direction along the light pipe toward a first end of the light pipe and second light associated with the image to travel in a second helical fashion in a second direction of the light pipe toward a second end of the light pipe;
    providing the first light and the second light from the light pipe to a waveguide combiner having a main surface, wherein the waveguide combiner is disposed at an angle with respect to the light pipe, the angle being greater than 0 degrees and less than 45 degrees, and wherein the waveguide combiner is detached from the light pipe and separated from the light pipe by an air gap; and
    providing the image from the main surface via an output coupler of the waveguide combiner that combines the first light and the second light, wherein the image is expanded in two axes using the first light and the second light and is viewable with both eyes of a user.

12. The method of claim 11, wherein the light pipe comprises a first light pipe input grating at the center portion and a first light pipe output grating at the first end and a second light pipe input grating at the center portion and a second light pipe output grating at the second end.

13. The method of claim 12, wherein the first light pipe input grating is associated with a first field of view and the second light pipe input grating is associated with a second field of view.

14. The method of claim 13, wherein the first field of view and the second field of view do not overlap.

15. A head up display system, comprising:
at least one light pipe having four or more elongated surfaces, wherein a first pair of the elongated surfaces are parallel to each other and a second pair of the elongated surfaces are at an angle with respect to the first pair of the elongated surfaces, wherein the light pipe is configured to expand a pupil in a direction parallel to the four elongated surfaces, wherein the light pipe comprises a first light pipe input coupler configured to direct first light associated with a first field of view in a first direction and a second light pipe input coupler configured to direct second light associated with a second field of view in a second direction, the first light and the second light striking the four elongated sides and traveling along the light pipe; and
a waveguide combiner having a main surface for viewing an image associated with the first light and the second light via an output coupler of the waveguide combiner configured to combine the first light and the second light, wherein the waveguide combiner is configured to expand the pupil in another direction on the main surface, wherein a unified image using the first light and the second light;
wherein the waveguide combiner is disposed at an angle with respect to the at least one light pipe, the angle being greater than 0 degrees and less than 45 degrees, and wherein the waveguide combiner is detached from the at least one light pipe and separated from the at least one light pipe by an air gap.

16. The head up display system of claim 15 further comprising a collimator.

17. The head up display system of claim 15, wherein the head up display system is a fixed head up display or a head worn display.

18. The head up display system of claim 15, wherein the unified image is a single image viewed by both eyes of a user together.

19. The head up display of claim 1, wherein the output coupler is a single combiner output grating.

* * * * *